US011920495B1

(12) United States Patent
Campbell

(10) Patent No.: US 11,920,495 B1
(45) Date of Patent: Mar. 5, 2024

(54) AIRFOIL WITH THICK WISHBONE FIBER STRUCTURE

(71) Applicant: RAYTHEON TECHNOLOGIES CORPORATION, Farmington, CT (US)

(72) Inventor: Christian X. Campbell, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/099,610

(22) Filed: Jan. 20, 2023

(51) Int. Cl.

| | |
|---|---|
| ***F01D 5/14*** | (2006.01) |
| ***F01D 5/18*** | (2006.01) |
| ***F01D 5/28*** | (2006.01) |
| ***F01D 9/06*** | (2006.01) |

(52) U.S. Cl.
CPC ............. *F01D 5/147* (2013.01); *F01D 5/188* (2013.01); *F01D 5/282* (2013.01); *F01D 5/284* (2013.01); *F01D 5/187* (2013.01); *F01D 9/065* (2013.01); *F05D 2240/304* (2013.01); *F05D 2260/2214* (2013.01); *F05D 2300/6033* (2013.01); *F05D 2300/6034* (2013.01)

(58) Field of Classification Search
CPC .......... F01D 5/186; F01D 5/187; F01D 5/188; F01D 5/189; F01D 9/06; F01D 9/065; F01D 5/282; F01D 5/284; F05D 2260/20; F05D 2260/201; F05D 2260/202; F05D 2300/6033; F05D 2300/6034; F05D 2300/601
See application file for complete search history.

(56) References Cited

U.S. PATENT DOCUMENTS

| | | | |
|---|---|---|---|
| 7,066,717 B2 | 6/2006 | Morrison et al. |
| 7,575,417 B2 | 8/2009 | Finn et al. |
| 7,600,978 B2 | 10/2009 | Vance et al. |
| 7,600,979 B2 | 10/2009 | Steibel et al. |
| 9,664,053 B2 | 5/2017 | Marshall et al. |
| 10,569,481 B2 | 2/2020 | Gallier et al. |
| 11,261,741 B2 | 3/2022 | Kennedy et al. |

(Continued)

FOREIGN PATENT DOCUMENTS

| | | |
|---|---|---|
| EP | 3415717 | 12/2018 |
| EP | 3587736 | 1/2020 |
| WO | 2014186011 | 11/2014 |

OTHER PUBLICATIONS

Calomino, A. and Verrilli, M. (2004). Ceramic matrix composite vane subelement fabrication. Proceedings of ASME Turbo Expo 2004. Jun. 14-17, 2004. pp. 1-7.

*Primary Examiner* — Christopher Verdier
(74) *Attorney, Agent, or Firm* — Carlson, Gaskey & Olds, P.C.

(57) ABSTRACT

An airfoil includes an airfoil wall that has a wishbone-shaped fiber layup structure. The structure includes two arms that merge into a single leg. The single leg includes fiber tows from each of the arms that are interwoven. The single leg forms at least a portion of the trailing edge of the airfoil wall. Each of the arms includes a first section that is distal from the single leg and a second section that is proximal to the single leg. The first section defines a first thickness, the second section defines a second thickness that is greater than the first thickness, and the single leg defines a third thickness that is greater than the second thickness.

14 Claims, 5 Drawing Sheets

(56) References Cited

U.S. PATENT DOCUMENTS

| | | | | |
|---|---|---|---|---|
| 11,346,228 | B1 * | 5/2022 | Burdette | D03D 1/00 |
| 2018/0363475 | A1 * | 12/2018 | de Diego | C04B 35/622 |
| 2020/0232332 | A1 | 7/2020 | Farrar et al. | |
| 2021/0032995 | A1 * | 2/2021 | Razzell | C04B 35/573 |
| 2021/0140325 | A1 | 5/2021 | Kennedy | |
| 2021/0189889 | A1 | 6/2021 | Decesare et al. | |
| 2022/0090505 | A1 * | 3/2022 | Farmer | F01D 5/282 |
| 2022/0228496 | A1 | 7/2022 | Banhos et al. | |

* cited by examiner

AIRFOIL WITH THICK WISHBONE FIBER STRUCTURE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil wall circumscribing a cavity and defining a leading edge, a trailing edge, and pressure and suction sides that join the leading edge and the trailing edge. The airfoil wall includes a wishbone-shaped fiber layup structure. The wishbone-shaped fiber structure includes first and second arms that merge into a single leg. The first and second arms are comprised of a network of fiber tows. The single leg inclues fiber tows from each of the first and second arms that are interwoven. The single leg forms at least a portion of the trailing edge of the airfoil wall. Each of the first and second arms include a first section that is distal from the single leg and a second section that is proximal to the single leg. The first section defines a first thickness and the second section defining a second thickness that is greater than the first thickness. The single leg defines a third thickness that is greater than the second thickness.

In a further embodiment of any of the foregoing embodiments, the third thickness is greater than the first thickness by a factor of at least 3.

In a further embodiment of any of the foregoing embodiments, the third thickness is greater than the first thickness by a factor of 3.2-4.8.

In a further embodiment of any of the foregoing embodiments, the second thickness is greater than the first thickness by a factor of at least 1.5.

In a further embodiment of any of the foregoing embodiments, the second thickness is greater than the first thickness by a factor of 1.6-2.4.

In a further embodiment of any of the foregoing embodiments, the third thickness is greater than the first thickness by a factor of 3.2-4.8, and the second thickness is greater than the first thickness by a factor of 1.6-2.4.

In a further embodiment of any of the foregoing embodiments, the airfoil wall includes at least one cooling hole within the single leg and that opens to the cavity.

In a further embodiment of any of the foregoing embodiments, the airfoil wall includes an insert located in a pocket between the second section of the first arm and the second section of the second arm.

In a further embodiment of any of the foregoing embodiments, the insert includes a concave forward side and a convex aft side facing, respectively, toward the leading edge and the trailing edge. The concave forward side and the convex aft side have approximately equivalent radii of curvature.

In a further embodiment of any of the foregoing embodiments, the airfoil wall includes first and second fiber plies, the first fiber ply in contact with and conformance with the concave forward side, the second fiber ply in contact with and conformance with the convex aft side, wherein the radii of curvature of the concave forward side and the convex aft side are equal to a minimum bend radius of the first and second fiber plies.

In a further embodiment of any of the foregoing embodiments, the airfoil wall includes first and second trailing edge plies between which the single leg is sandwiched, the first and second trailing edge plies extending along the single leg and along a portion of the second sections of, respectively, the first and second arms.

In a further embodiment of any of the foregoing embodiments, the first and second trailing edge plies terminate at a location that is aft of the first sections of, respectively the first and second arms and that is forward of a location at which the first and second arms merge to form the single leg.

In a further embodiment of any of the foregoing embodiments, the airfoil wall includes at least one skin fiber ply that wraps around the cavity and partially overlaps the first and second trailing edge plies.

In a further embodiment of any of the foregoing embodiments, the trailing edge is machined.

A gas turbine engine according to an example of the present disclosure includes a compressor section, a combustor in fluid communication with the compressor section, and a turbine section in fluid communication with the combustor. The turbine section includes a plurality of airfoils. Each airfoil has an airfoil wall circumscribing a cavity and defining a leading edge, a trailing edge, and pressure and suction sides that join the leading edge and the trailing edge. The airfoil wall includes a wishbone-shaped fiber layer structure. The wishbone-shaped fiber layup structure includes first and second arms that merge into a single leg. The first and second arms are comprised of a network of fiber tows. The single leg includes fiber tows from each of the first and second fiber sections that are interwoven. The single leg forms at least a portion of the trailing edge of the airfoil wall. Each of the first and second arms include a first section that is distal from the single leg and a second section that is proximal to the single leg. The first section defines a first thickness and the second section defines a second thickness that is greater than the first thickness. The single leg defines a third thickness that is greater than the second thickness.

In a further embodiment of any of the foregoing embodiments, the third thickness is greater than the first thickness by a factor of 3.2-4.8, and the second thickness is greater than the first thickness by a factor of 1.6-2.4.

In a further embodiment of any of the foregoing embodiments, the airfoil wall includes first and second trailing edge plies between which the single leg is sandwiched. The first and second trailing edge plies extend along the single leg and along a portion of the second sections of, respectively, the first and second arms, and the first and second trailing edge plies terminate at a location that is aft of the first sections of, respectively the first and second arms and that is forward of a location at which the first and second arms merge to form the single leg.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
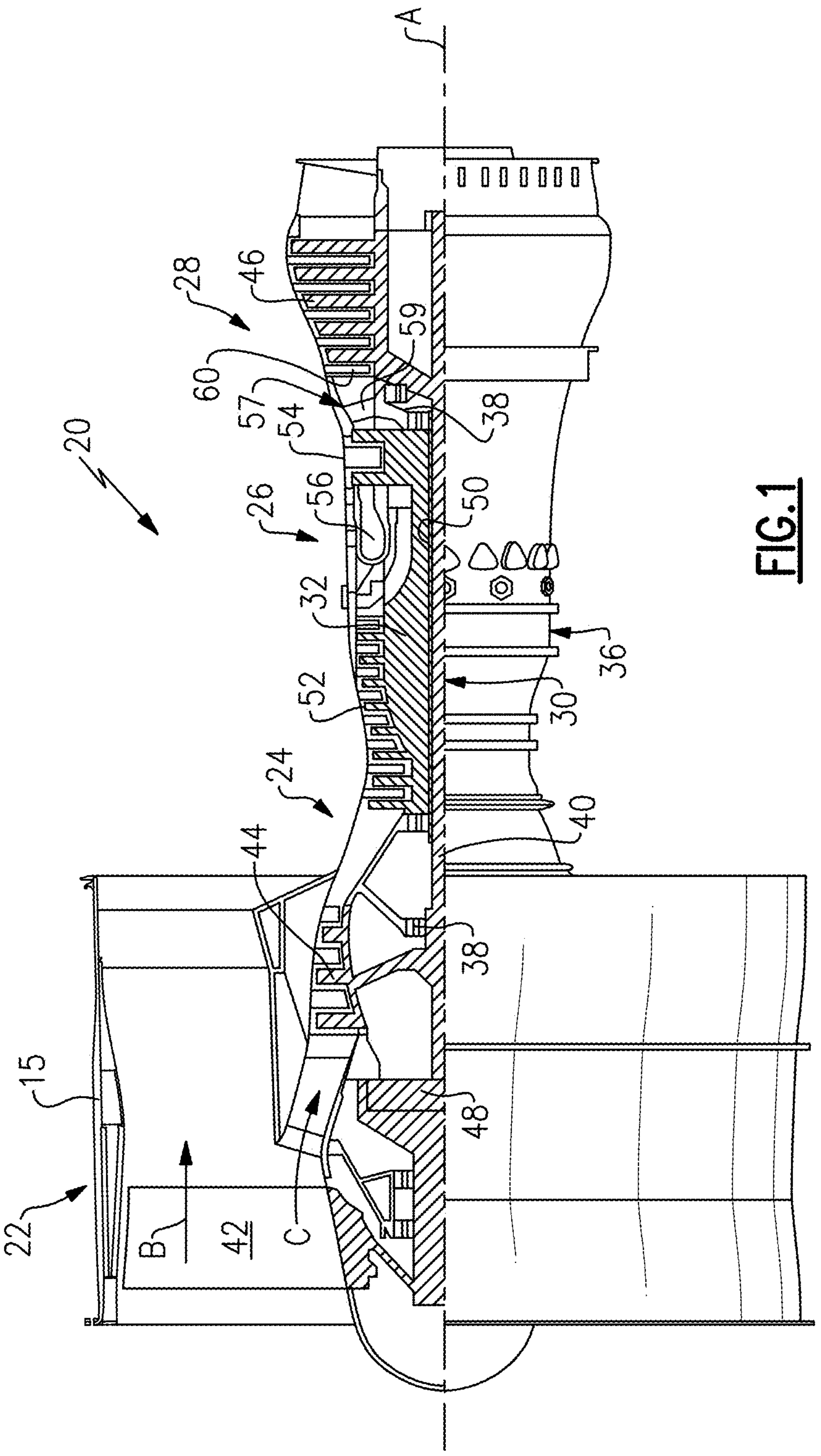
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
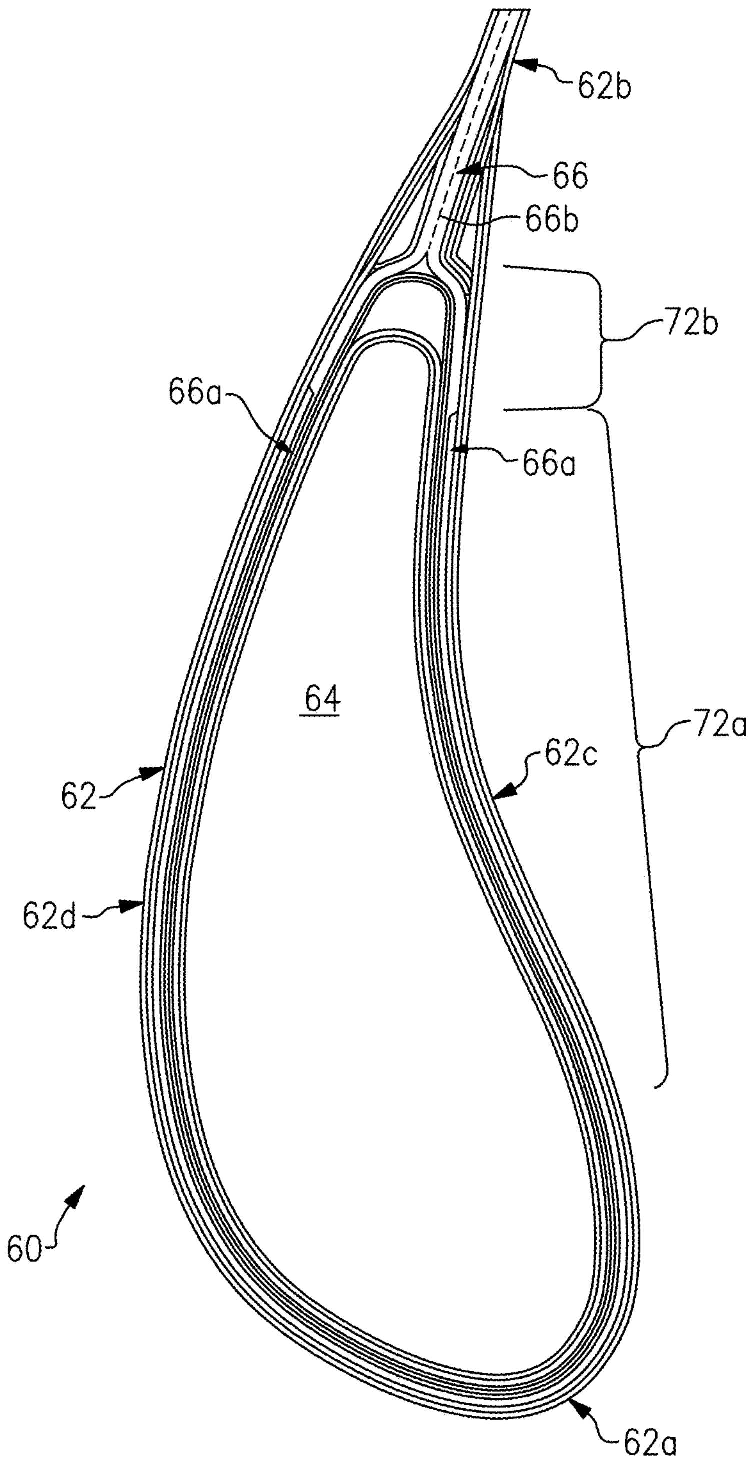
FIG. 2 illustrates a sectioned view of an airfoil from the engine.

FIG. 2 illustrates a sectioned view of an example airfoil 60 from the turbine section 28 of the engine 20 (see also FIG. 1). For example, the airfoil 60 may be a blade or a vane. It is to be understood that although the examples herein are discussed in context of a turbine airfoil, the examples can also be applied to airfoils in other sections of the engine 20.

The aerodynamic profile of the airfoil 60 is formed by an airfoil wall 62. In this regard, the airfoil wall 62 defines a leading edge 62*a*, a trailing edge 62*b*, a pressure side 62*c*, and a suction side 62*d* of the airfoil 60. The airfoil wall 62 circumscribes an interior cavity 64, to which cooling air (e.g., from the compressor section 24) may be provided. One or more ribs may be provided across the cavity 64 to partition it into two or more sub-cavities.

The airfoil wall 62 is formed of a ceramic matrix composite (CMC). A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

Figure 3:
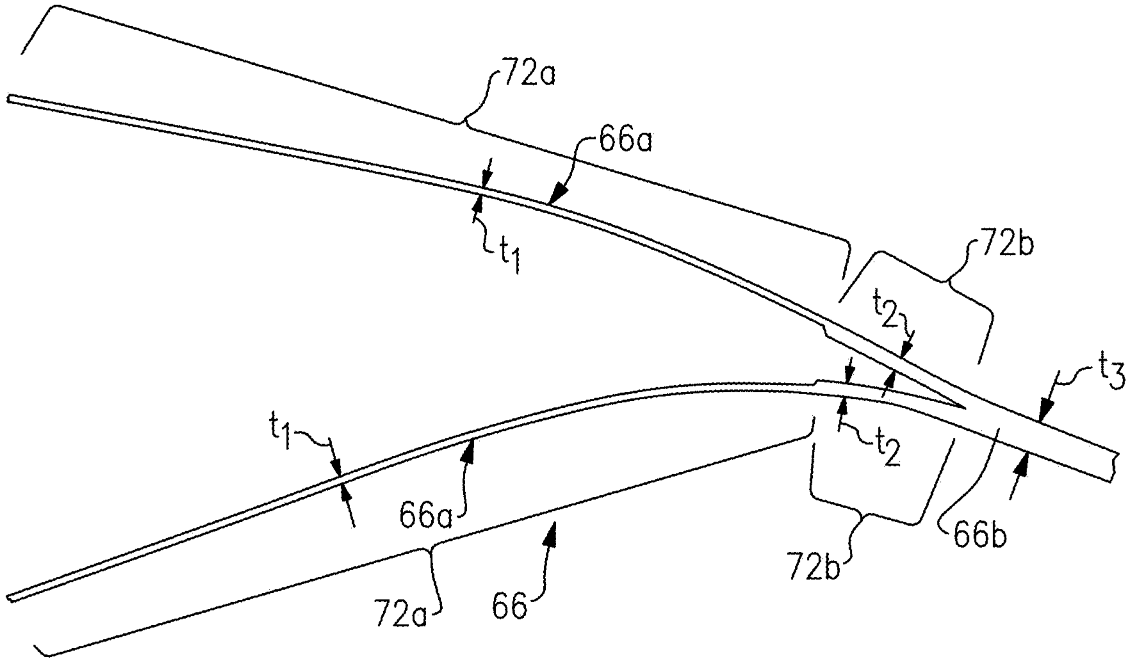
FIG. 3 illustrates a wishbone fiber structure from the airfoil.
Figure 4:
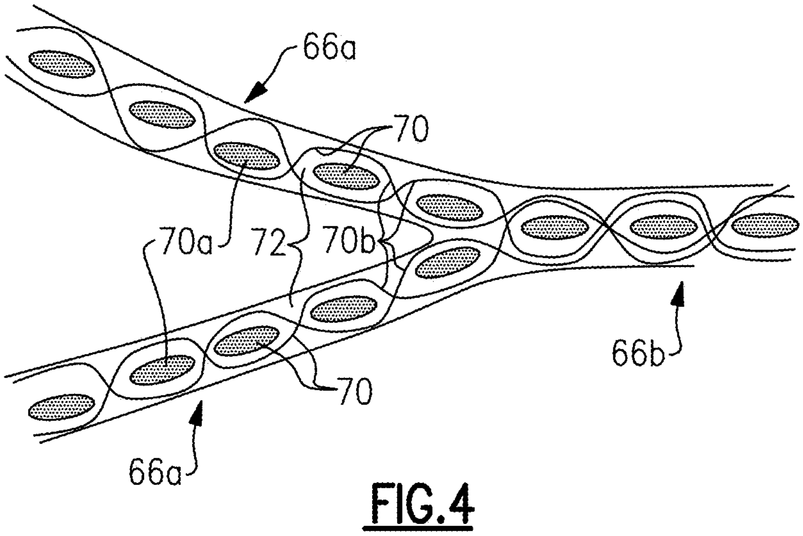
FIG. 4 illustrates a fiber configuration of the wishbone fiber structure.

The airfoil wall 62 includes a wishbone-shaped fiber layup structure 66, which is also shown in an isolated, sectioned view (taken along a plane that includes the engine axis A) in FIG. 3. The term "wishbone-shaped" refers to the resemblance of the structure 66 to a wishbone that has a leg and two arms that extend from an end of the leg to form a "V." Here, the structure 66 includes a pair of arms 66*a* that merge into a single leg 66*b*. FIG. 4 shows a representative example of the fiber configuration of the structure 66 for the purpose of describing how the arms 66*a* merge into the leg 66*b* (figure not to scale and may contain additional fiber tows). The arms 66*a* are comprised of a network (e.g., a weave) of fiber tows 70 (warp tows 70*a* and weft tows 70*b*) that are disposed in a matrix material 72. It is to be understood that, although the network of fiber tows 70 is shown with a particular weave pattern, other weave patterns may be used. The weft tows 70*b* merge together such that the tows 70*b* from each of the arms 66*a* are interwoven in the single leg 66*b*. Thus, once merged, the arms 66*a* cease to be distinct from each other and there are no interlaminar interfaces.

Referring again to FIG. 3, each of the first and second arms 66*a* include a first section 72*a* that is distal from the single leg 66*b* and a second section 72*b* that is proximal to the single leg 66*b*. The first section 72*a* defines a first thickness (t1) and the second section 72*b* defines a second thickness (t2) that is greater than the first thickness (t1). The single leg 66*b* defines a third thickness (t3) that is greater than the second thickness (t2).

In a wishbone fiber structure in which the arms simply merge into a single leg, the leg may nominally be of equal or lesser thickness than the sum of the thickness of the arms. While mechanically strong, this thickness of the single leg may not be desirable in some designs, particularly where cooling holes are to be drilled through the trailing edge to the internal cavity. For instance, the diameter of the cooling hole may exceed or approach the thickness of the single leg and thus require an undesirable condition in which the cooling hole has to be drilled along an interlaminar interface between the single leg and an adjacent fiber layer.

In the structure 66, however, the arms 66*a* increase in thickness from the first section 72*a* to the second section 72*b*. Thus, when the second sections 72*b* merge, a thicker single leg 66*b* is formed. The increased thickness of the second sections 72*b* in comparison to the first sections 72*a* allows for more tows to interconnect in the single leg 66*b*, thereby enhancing strength and toughness in the trailing edge 62*b* and preventing delamination. Such a configuration further permits the first sections 72*a* to be relatively thin so that they remain pliable and can be conformed to a desirable design geometry of the airfoil 60. Accordingly, the structure 66 provides a thicker single leg 66*b* without having to make the arms 66*a* so thick that they lose pliability. The thickness also facilitates containment of drilled cooling holes, thereby reducing the chances of causing delamination. The structure 66 may also facilitate reducing disparities at the free surfaces in the tip of the trailing edge 62*b*. For instance, a starting fabric may have discontinuities at its edges, where fibers are misaligned or unraveled. If such discontinuities are ultimately located at the tip of the trailing edge, the properties of the tip region may be debited. However, the use of the excess sacrificial length of the single leg 66*b* means that the tip of the trailing edge 62*b* correspond to a central portion of the fabric instead of a free edge.

In one example, the third thickness (t3) is greater than the first thickness (t1) by a factor of at least 3, such as by a factor of 3.2-4.8. In a further example, the second thickness (t2) is greater than the first thickness (t1) by a factor of at least 1.5, such as by a factor of 1.6-2.4. In the above examples, the first thickness (t1) may be from approximately 0.005 to 0.015 inches.

Figure 5:
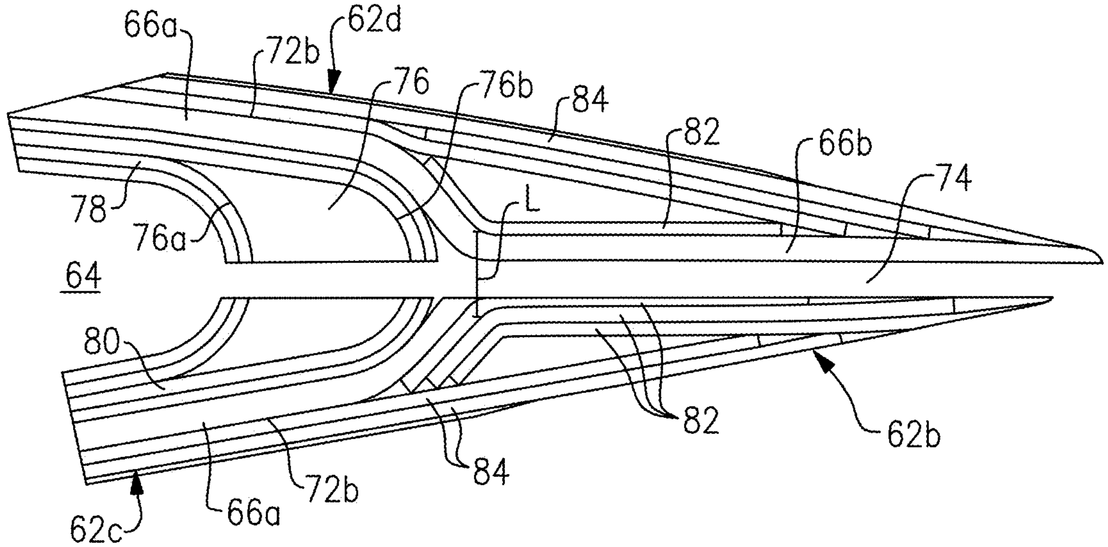
FIG. 5 illustrates a fiber ply lay-up configuration in the trailing edge of an airfoil.

FIG. 5 illustrates a fiber ply lay-up configuration in the trailing edge 62*b* and vicinity, to demonstrate an example implementation of the structure 66. Although the illustrated configuration is useful, it is to be appreciated that the structure 66 is not limited and may be used in other configurations. The airfoil wall 62 includes at least one cooling hole 74 that extends substantially within the single leg 66*b* and that opens to the cavity 64. As shown, the cooling hole 74 is biased toward the pressure side 62*c* of the airfoil 60. As a result, at the location of the hole 74 there is a greater thickness of the single leg 66*b* on the suction side 62*d* of the hole 74 than on the pressure side 62*c*. Such a biasing maintains more material on the suction side 62*d* of the hole 74, where higher stresses are expected in comparison to the lower stress pressure side 62*c*.

There is also an insert 76 located in a pocket between the second sections 72*b* of the arms 66*a*. The insert 76 is a non-structural spacer and is sometimes referred to as a "noodle" because it may be formed from a bundle of fiber tows that resemble spaghetti noodles, although it can alternatively be formed of other materials such as, but not limited to, monolithic ceramics.

The insert 76 includes a concave forward side 76*a* and a convex aft side 76*b* that face, respectively, toward the leading edge 62*a* and the trailing edge 62*b*. The term "concave" and "convex" are relative to the center of the insert 76. The sides 76*a*/76*b* have approximately equivalent radii of curvature. The airfoil wall 62 further includes at least first and second fiber plies 78/80. The first fiber ply 78 is in contact with, and conformance with, the concave forward side 76*a*. The second fiber ply 80 is in contact with, and conformance with, the convex aft side 76*b*. The radii of curvature of the sides 76*a*/76*b* are equal to a minimum bend radius of the fiber plies 78/80. A minimum bending radius can be determined from a supplier of the fabric, estimated based on fiber properties, or readily determined by trial. For example, a fiber tow is wrapped around cylinders with progressively smaller diameters, and the point at which the tows begin to break is the minimum bend radius.

In the trailing edge 62*b*, the airfoil wall 62 also includes various other fiber layers that help form the desired geometry. The airfoil wall 62 includes trailing edge plies 82 between which the single leg 66*b* is sandwiched. The plies 82 are relatively small and only extend only a short distance forward along the single leg 66*b* and along a portion of the second sections 72*b* of the arms 66*a* before terminating. The plies 82 terminate at a location that is aft of the first section 72*a* and that is forward of a location (L) at which the arms 66*a* merge to form the single leg 66*b*.

One or more of the plies 82 are interleaved with one or more skin fiber plies 84 that wrap completely around the airfoil 60, i.e., from the trailing edge 62*b*, through the pressure side 62*c*, through the leading edge 62*a*, through the suction side 62*d*, and back to the trailing edge 62*b*. In this interleaved structure, at least one or more of the plies 82 are exposed on the exterior of the aft portion of the trailing edge 62*b*. The skin plies 84 overlap the forward portions of the one or more plies 80. Such a configuration permits the trailing edge 62*b* to taper in thickness, and if any delamination should occur at the trailing free edge of the one or more plies 80, the short length of the plies 80 arrests the delamination in the trailing edge 62*b* because the plies 80 do not extend further forward.

Figure 6:
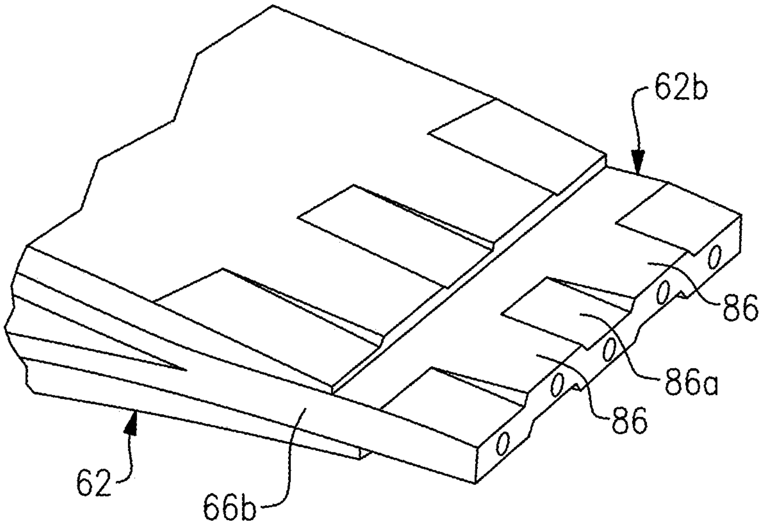
FIG. 6 illustrates an example of an airfoil with a machined edge.

FIG. 6 illustrates an additional example of the airfoil 60. In this example, the trailing edge 62*b* is machined at 86. For example, the machined edge 86 is scalloped by machining axial slots 86*a* into the surface of the trailing edge 62*b*. The trailing edge 62*b* gets relatively hotter than forward portions of the airfoil 60 during engine operation. This discrepancy in temperature can cause thermal stresses. The scalloped configuration permits the trailing edge 62*b* to be thinner in some locations, and thus more pliable in order to facilitate mitigation of thermal stresses. Additionally, the geometry of the machined edge 86 may be used to tailor the frequency vibration response of the trailing edge 62*b*, to facilitate mitigation of vibrational stresses.

Figure 7:
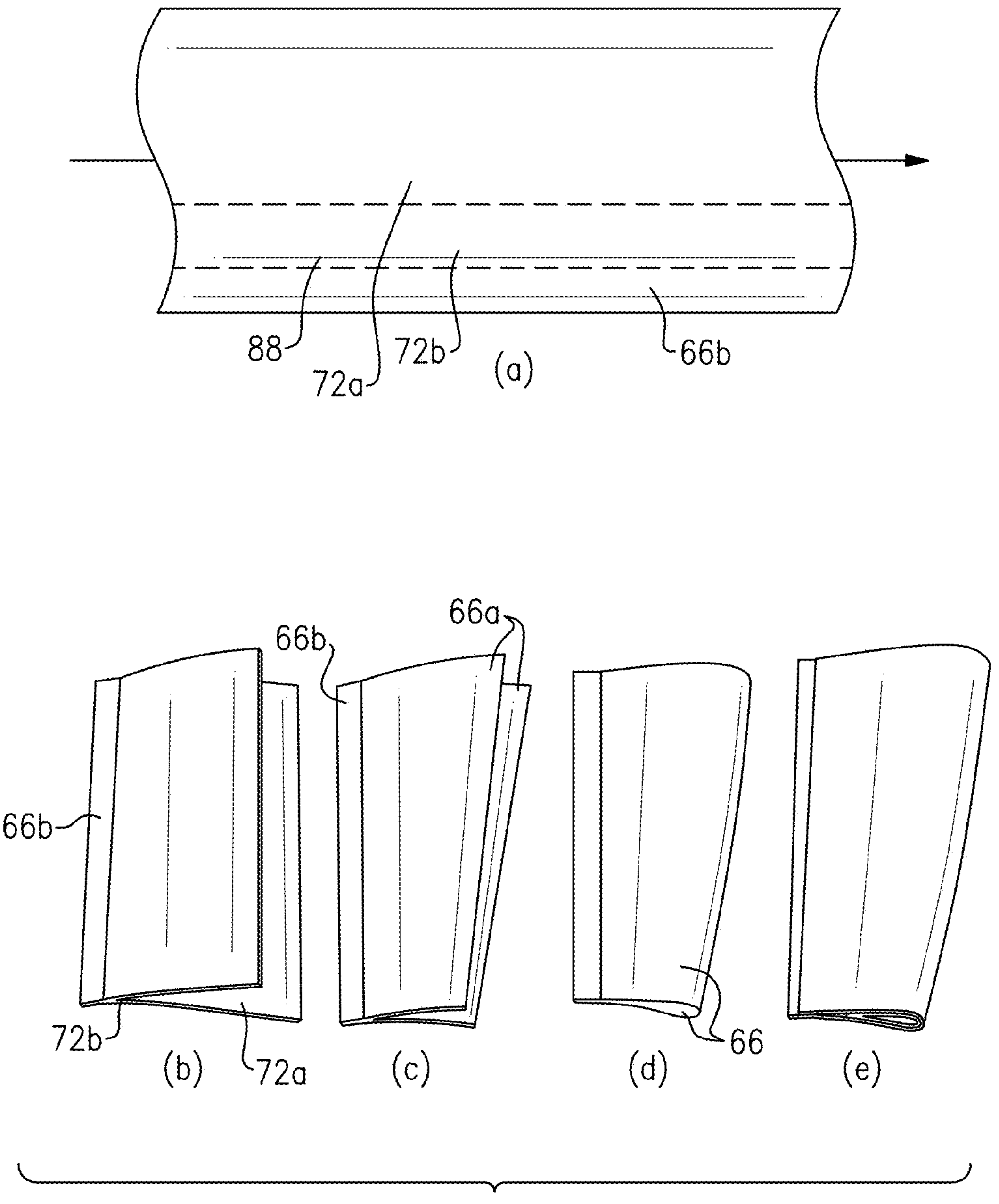
FIG. 7 demonstrates an example of fabricating an airfoil.

FIG. 7 demonstrates an example of fabricating the airfoil 60. At step (a), a fabric 88 is provided. The fabric 88 may be provided as a pre-made product or, if not pre-made, the fabric 88 may be made in a weaving process. The fabric 88 is woven in the warp direction such that the single leg 66*b* runs length-wise in the warp direction. To step-down the thickness from the single leg 66*b* to the thinner second segment 72*b* and from the second segment 72*b* to the thinner first segment 72*a*, the number of warp fibers is reduced and/or some of the weft fibers that are woven in 66*b* are left unwoven for 72/72*b* (and later cut off). Thus, the thickness of 66*b*/72*a*/72*b* can be controlled by manipulating the numbers of fibers and/or by using looser or tighter weave patterns.

At step (b), the fabric length is trimmed to the desired size of the airfoil 60 that is to be produced. For example, the fabric length corresponds to the radial span that the airfoil 60 will have. At step (c), the arms 66*a* are trimmed to the desired geometry of the airfoil 60 that is to be produced. For example, the arms 66*a* are trimmed at an angle such that the chord of the airfoil either increases or decreases over the radial span. At step (d), the arms 66*a* are wrapped to form the geometry of the airfoil 60. For instance, the arms 66*a* may be wrapped around a mandrel to form the desired shape. At step (e), the additional plies 82/84 are applied, followed by densification to add a fiber interface coating and the matrix material. Afterwards, one or more post-processing steps may be conducted, depending on the airfoil design. For instance, the single leg 66*b* may initially be over-sized in the axial direction. In that case, the excess sacrificial length may be trimmed to produce the design geometry. Additionally or alternatively, the cooling hole(s) 74 may be drilled in the trailing edge 62*b*. For example, laser drilling may be used. In further examples, the trailing edge 62*b* may be further machined to tailor the geometry. For instance, the scallops 86 may be machined into the trailing edge, or the terminal ends of the pressure and/or suction sides may be "scarf" machined to round-off relatively sharp edges that may otherwise fracture off during use.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:

an airfoil wall circumscribing a cavity and defining a leading edge, a trailing edge, and pressure and suction sides that join the leading edge and the trailing edge, the airfoil wall including a wishbone-shaped fiber layup structure, the wishbone-shaped fiber structure including first and second arms that merge into a single leg, the first and second arms being comprised of a network of fiber tows, the single leg including fiber tows from each of the first and second arms that are interwoven, the single leg forming at least a portion of the trailing edge of the airfoil wall, each of the first and second arms including a first section that is distal from the single leg and a second section that is proximal to the single leg, the first section defining a first thickness and the second section defining a second thickness that is greater than the first thickness by a factor of 1.6-2.4, and the single leg defining a third thickness that is greater than the second thickness.

2. The airfoil as recited in claim 1, wherein the third thickness is greater than the first thickness by a factor of at least 3.

3. The airfoil as recited in claim 2, wherein the third thickness is greater than the first thickness by a factor of 3.2-4.8.

4. The airfoil as recited in claim 1, wherein the airfoil wall includes at least one cooling hole within the single leg and that opens to the cavity.

5. The airfoil as recited in claim 1, wherein the airfoil wall includes an insert located in a pocket between the second section of the first arm and the second section of the second arm.

6. The airfoil as recited in claim 5, wherein the insert includes a concave forward side and a convex aft side facing, respectively, toward the leading edge and the trailing edge, the concave forward side and the convex aft side have equivalent radii of curvature.

7. The airfoil as recited in claim 6, wherein the airfoil wall includes first and second fiber plies, the first fiber ply in contact with and conformance with the concave forward side, the second fiber ply in contact with and conformance with the convex aft side, wherein the radii of curvature of the concave forward side and the convex aft side are equal to a minimum bend radius of the first and second fiber plies.

8. The airfoil as recited in claim 1, wherein the airfoil wall includes first and second trailing edge plies between which the single leg is sandwiched, the first and second trailing edge plies extending along the single leg and along a portion of the second sections of, respectively, the first and second arms.

9. The airfoil as recited in claim 8, wherein the first and second trailing edge plies terminate at a location that is aft of the first sections of, respectively, the first and second arms and that is forward of a location at which the first and second arms merge to form the single leg.

10. The airfoil as recited in claim 9, wherein the airfoil wall includes at least one skin fiber ply that wraps around the cavity and partially overlaps the first and second trailing edge plies.

11. The airfoil as recited in claim 1, where the trailing edge is machined.

12. A gas turbine engine comprising:

a compressor section;

a combustor in fluid communication with the compressor section; and a turbine section in fluid communication with the combustor, the turbine section including a plurality of airfoils, each airfoil having an airfoil wall circumscribing a cavity and defining a leading edge, a trailing edge, and pressure and suction sides that join the leading edge and the trailing edge, the airfoil wall including a wishbone-shaped fiber layer structure, the wishbone-shaped fiber layup structure including first and second arms that merge into a single leg, the first and second arms being comprised of a network of fiber tows, the single leg including fiber tows from each of the first and second fiber sections that are interwoven, the single leg forming at least a portion of the trailing edge of the airfoil wall, each of the first and second arms including a first section that is distal from the single leg and a second section that is proximal to the single leg, the first section defining a first thickness and the second section defining a second thickness that is greater than the first thickness by a factor of 1.6-2.4, and the single leg defining a third thickness that is greater than the second thickness.

13. The gas turbine engine as recited in claim 12, wherein the third thickness is greater than the first thickness by a factor of 3.2-4.8.

14. The gas turbine engine as recited in claim 13, wherein the airfoil wall includes first and second trailing edge plies between which the single leg is sandwiched, the first and second trailing edge plies extending along the single leg and along a portion of the second sections of, respectively, the first and second arms, and the first and second trailing edge plies terminate at a location that is aft of the first sections of, respectively, the first and second arms and that is forward of a location at which the first and second arms merge to form the single leg.

* * * * *